US009500316B2

(12) United States Patent
Terpening (10) Patent No.: US 9,500,316 B2
(45) Date of Patent: Nov. 22, 2016

(54) SYSTEM AND APPARATUS FOR THE SUPPORT OF OPTICS

(71) Applicant: Jeffrey Allen Terpening, Surprise, AZ (US)

(72) Inventor: Jeffrey Allen Terpening, Surprise, AZ (US)

(73) Assignee: Bino-Tree LLC, Surprise, AZ (US)

( * ) Notice: Subject to any disclaimer, the term of this patent is extended or adjusted under 35 U.S.C. 154(b) by 0 days.

(21) Appl. No.: 14/338,166

(22) Filed: Jul. 22, 2014

(65) Prior Publication Data

US 2015/0028169 A1    Jan. 29, 2015

Related U.S. Application Data

(60) Provisional application No. 61/857,335, filed on Jul. 23, 2013.

(51) Int. Cl.
| | |
|---|---|
| F16M 13/04 | (2006.01) |
| A45F 5/00 | (2006.01) |
| G02B 7/00 | (2006.01) |
| G02B 23/18 | (2006.01) |
| G03B 17/56 | (2006.01) |
| F41C 33/00 | (2006.01) |
| F16M 11/04 | (2006.01) |

(52) U.S. Cl.
CPC ............... *F16M 13/04* (2013.01); *A45F 5/00* (2013.01); *F16M 11/046* (2013.01); *F41C 33/001* (2013.01); *G02B 7/002* (2013.01); *G02B 23/18* (2013.01); *G03B 17/561* (2013.01); *A45F 2005/006* (2013.01)

(58) Field of Classification Search
CPC .... G02B 7/002; G02B 23/18; G03B 17/561; F16M 13/04; A45F 2005/006; F41C 33/001

USPC ........................................................ 396/420
See application file for complete search history.

(56) References Cited

U.S. PATENT DOCUMENTS

| | | | | |
|---|---|---|---|---|
| 1,103,824 A * | 7/1914 | Page | ..................... | F41C 33/001 42/94 |
| 2,015,869 A * | 10/1935 | Pulz | ......................... | A45F 3/10 224/201 |
| 2,552,205 A * | 5/1951 | Moss | ..................... | F16M 13/04 224/259 |
| 2,636,822 A * | 4/1953 | Anderson | .............. | F16M 13/04 224/185 |
| 2,658,435 A * | 11/1953 | Sarvoy | ................... | F16M 13/04 2/300 |
| 2,711,122 A * | 6/1955 | Klumpp | ................. | F16M 13/04 224/185 |
| 2,771,826 A * | 11/1956 | Shapiro | .................. | F16M 13/04 224/257 |

(Continued)

FOREIGN PATENT DOCUMENTS

| | | | | |
|---|---|---|---|---|
| DE | 812966 C * | 9/1951 | ............. | F16M 13/04 |
| DE | 872652 C * | 4/1953 | ............. | F16M 13/04 |

(Continued)

*Primary Examiner* — Eret McNichols
(74) *Attorney, Agent, or Firm* — Rose Law Group pc (57) ABSTRACT

An optics support system and apparatus are provided. The optics support system may comprise a first member, a second member, a base, and a support strap. The first member may be attached to a top rest at one end, and the base at the other end. The second member may extend at an angle from the middle of the first member, and may be attached to a side rest at the opposite end. The base may be configured to have at least one aperture. The support strap may be configured to attach to the base by extending a portion of it through the at least one aperture of the base. A frictional adjuster may optionally be attached to the support strap to make the support strap adjustable in length.

14 Claims, 9 Drawing Sheets

(56) References Cited

U.S. PATENT DOCUMENTS

| | | | | |
|---|---|---|---|---|
| 3,326,430 A * | 6/1967 | Banks | A45F 5/00 | 224/254 |
| 3,390,477 A * | 7/1968 | Galbraith | F41C 33/001 | 248/118 |
| 3,882,524 A * | 5/1975 | Rauscher | F16M 13/04 | 396/420 |
| 4,005,840 A * | 2/1977 | Ratkovich | F16M 13/04 | 211/202 |
| 4,244,500 A * | 1/1981 | Fournier | A45F 5/00 | 224/201 |
| 4,437,753 A * | 3/1984 | Dunn | F16M 11/00 | 248/169 |
| 4,526,308 A * | 7/1985 | Dovey | F16M 11/20 | 224/185 |
| 4,545,660 A * | 10/1985 | Rudolf | F16M 11/00 | 248/171 |
| 4,575,964 A * | 3/1986 | Griffin | F16M 13/04 | 42/94 |
| 4,637,536 A * | 1/1987 | Wong | A45F 5/00 | 224/261 |
| 4,727,390 A * | 2/1988 | Brown | F16M 13/04 | 396/420 |
| 4,844,390 A * | 7/1989 | Duke | F41C 33/001 | 224/232 |
| D302,561 S * | 8/1989 | Goins | | 396/419 |
| 4,943,820 A * | 7/1990 | Larock | F16M 13/04 | 224/265 |
| 5,042,763 A * | 8/1991 | Wong | F16M 13/02 | 224/265 |
| 5,111,983 A * | 5/1992 | Simmons | F16M 13/04 | 224/258 |
| 5,332,136 A * | 7/1994 | Rudolph | F16M 13/04 | 224/185 |
| 5,628,135 A * | 5/1997 | Cady | F41A 23/16 | 42/94 |
| 5,735,496 A * | 4/1998 | Dube | F41C 33/001 | 248/118 |
| 5,778,589 A * | 7/1998 | Teague | F41A 23/02 | 42/94 |
| 5,784,820 A * | 7/1998 | Wood | F41C 33/001 | 42/94 |
| 5,819,461 A * | 10/1998 | Killian | F16M 13/04 | 42/94 |
| 5,930,931 A * | 8/1999 | Watson | F41A 23/04 | 206/317 |
| 6,009,655 A * | 1/2000 | Austin | F16M 13/04 | 42/94 |
| 6,082,034 A * | 7/2000 | Musmanno | F41B 5/1461 | 42/94 |
| 6,349,905 B1 * | 2/2002 | Mills | F16M 11/14 | 248/126 |
| 6,695,188 B1 * | 2/2004 | Bradshaw | F16M 13/04 | 224/245 |
| 6,764,231 B1 * | 7/2004 | Shubert | F16M 13/04 | 396/419 |
| 6,889,465 B1 * | 5/2005 | Holmes | F16M 13/04 | 248/431 |
| 7,065,914 B1 * | 6/2006 | Wagner, II | F41C 3/04 | 124/74 |
| 7,097,368 B2 * | 8/2006 | Gonzales | F16M 13/04 | 352/243 |
| 7,191,923 B1 * | 3/2007 | Kundig | F16M 11/02 | 224/257 |
| 7,244,070 B2 * | 7/2007 | Burnett | G03B 17/00 | 248/118 |
| 7,372,502 B2 * | 5/2008 | Gonzalez | F16M 13/04 | 224/908 |
| 7,691,075 B1 * | 4/2010 | Reece | G03B 17/561 | 602/20 |
| 8,004,605 B1 * | 8/2011 | Gonzales | F16M 11/041 | 348/376 |
| 8,132,669 B1 * | 3/2012 | Stubel | A45C 11/08 | 206/316.3 |
| 8,328,359 B2 * | 12/2012 | Monroe | F16M 11/14 | 348/376 |
| 8,413,936 B2 * | 4/2013 | Wang | F16M 11/10 | 248/155 |
| 8,418,900 B1 * | 4/2013 | Baker | A45F 5/00 | 224/262 |
| 8,539,709 B2 * | 9/2013 | Otto | F41C 23/18 | 42/94 |
| 8,662,064 B1 * | 3/2014 | Campbell | F41B 5/1426 | 124/86 |
| 8,763,297 B2 * | 7/2014 | Boll | A01M 31/02 | 42/94 |
| 8,985,877 B1 * | 3/2015 | Brewer | F16M 11/041 | 396/419 |
| 2002/0078617 A1 * | 6/2002 | Percival | F41A 23/12 | 42/94 |
| 2004/0031183 A1 * | 2/2004 | Cain | F41C 33/001 | 42/94 |
| 2004/0211799 A1 * | 10/2004 | Loughman | F16M 13/04 | 224/262 |
| 2005/0262753 A1 * | 12/2005 | Lahti | F41C 23/12 | 42/94 |
| 2007/0031143 A1 * | 2/2007 | Riccardi | F16M 13/04 | 396/420 |
| 2007/0261287 A1 * | 11/2007 | Hunt | F41C 33/002 | 42/94 |
| 2007/0266609 A1 * | 11/2007 | Wuertz | F41A 23/08 | 42/94 |
| 2008/0173681 A1 * | 7/2008 | Robinson | A45F 3/14 | 224/257 |
| 2012/0154988 A1 * | 6/2012 | Wessells | F16M 11/40 | 361/679.01 |
| 2013/0181024 A1 * | 7/2013 | Warner | F16M 11/26 | 224/576 |
| 2013/0214022 A1 * | 8/2013 | Harvey | F16M 11/041 | 224/623 |
| 2013/0341472 A1 * | 12/2013 | Parrott | F16M 11/048 | 248/118 |
| 2014/0231482 A1 * | 8/2014 | Chamberlayne | A45F 5/00 | 224/623 |
| 2015/0034685 A1 * | 2/2015 | Mak | F16M 13/04 | 224/257 |

FOREIGN PATENT DOCUMENTS

| | | | | |
|---|---|---|---|---|
| DE | 1920489 A1 * | 2/1971 | | F16M 13/04 |
| FR | 2607220 A1 * | 5/1988 | | F16M 13/04 |
| WO | WO 0203117 A1 * | 1/2002 | | G02B 7/002 |
| WO | WO 2004098483 A2 * | 11/2004 | | A45F 3/10 |

* cited by examiner

SYSTEM AND APPARATUS FOR THE SUPPORT OF OPTICS

CROSS-REFERENCES TO RELATED APPLICATIONS

This application claims priority to and the benefit of U.S. Provisional Patent Application No. 61/857,335 filed Jul. 23, 2013 and entitled PLASTIC DEVICE TO SUPPORT OPTICS, the entirety of which is hereby incorporated by reference for any purpose.

FIELD

The present disclosure generally relates to optics, and more specifically, to a system and apparatus for the support of optics.

BACKGROUND

Typical optics support systems are large and bulky. The user ordinarily must hold up and carry the large and bulky support systems while viewing through optics, causing straining and fatigue. In addition, because of the size and bulk of typical optics support systems, significant set up time, effort, and work to deploy is often required. In hunting or general viewing applications, this increases the weight of items that are carried into the field, while also causing increased straining, fatigue, and exertion as a result of prolonged optics use.

SUMMARY

In various embodiments, an apparatus for the support of optics may comprise a first member, a second member, a base, a top rest, a side rest, and a support strap. The first member may comprise a first end and a second end. The first member may be coupled at the first end to the base. The first member may be coupled at the second end to the top rest. The second member may comprise a first end and a second end. The second member may be coupled at the first end to the middle of the first member. The second member may extend from the first member at an angle. The second member may be coupled at the second end to the side rest. The base may comprise an at least one aperture. The support strap may removably couple to the base by extending a portion of the support strap through the at least one aperture of the base.

In various embodiments, a system for the support of optics may comprise a first member, a second member, a base, and a support strap. The first member may comprise a first end and a second end. The first member may be integrally formed at the first end to the base. The first member may be integrally formed at the second end to a top rest. The top rest may comprise a curved surface. The second member may comprise a first end and a second end. The second member may be integrally formed at the first end to the middle of the first member. The second member may extend from the first member at an angle. The second member may be integrally formed at the second end to a side rest. The side rest may comprise a curved surface. The support strap may be configured to attach to the base.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the invention, it should be understood that other embodiments may be realized and that logical, chemical and mechanical changes may be made without departing from the spirit and scope of the invention. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an optics support system is provided. The optics support system may be configured to support an optic device in order to relieve the strain and fatigue caused by holding up the weight of that device. The optics support system may be configured for use by a right-handed person or a left-handed person. The optics support system may be made of any suitable material including, for example, a metal, an alloy, a composite, plastic, a polymer, wood, and/or any other suitable material. The optics support system may also comprise any suitable coating and/or finish. The optics support system may be a one-piece device made using any suitable process such as, for example, plastic injection molding, machining, casting, and/or the like. The optics support system may also be an assembly of parts.

Figure 1A:
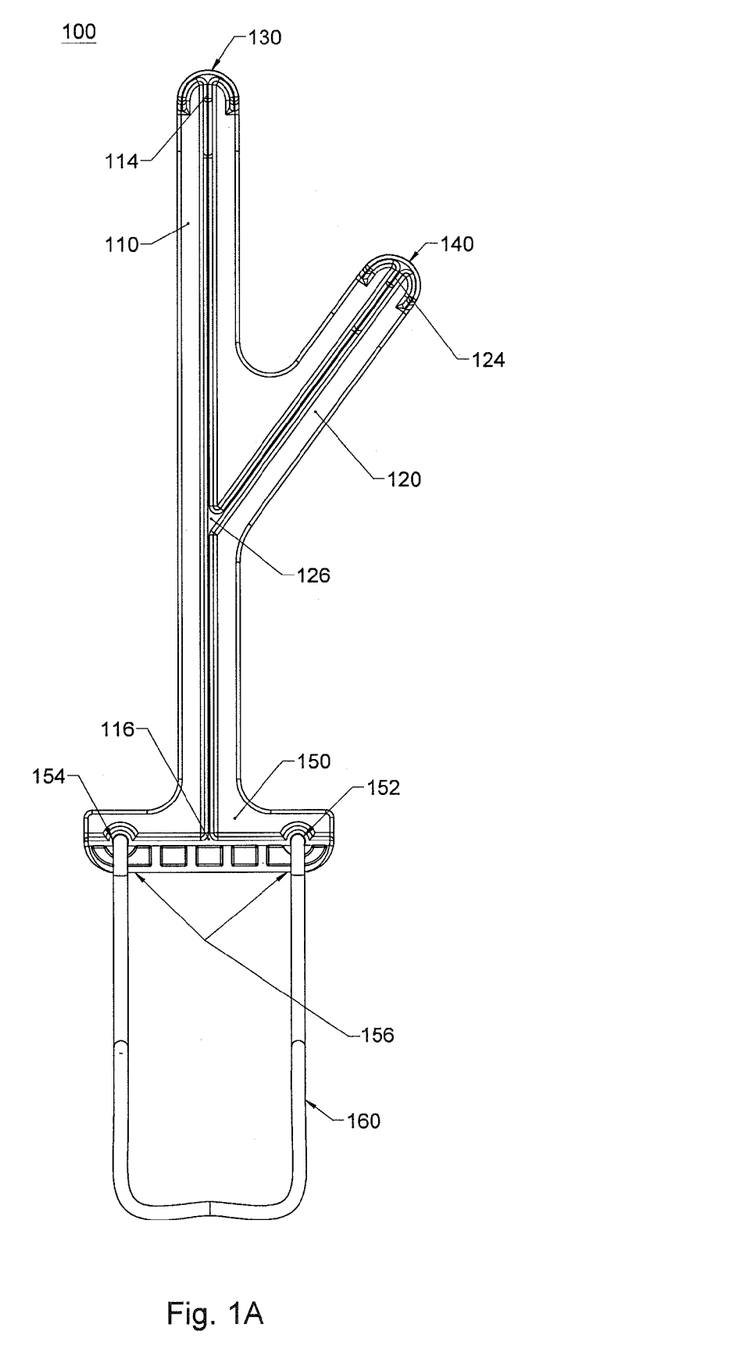
FIG. 1A illustrates a first side view of an optics support system, in accordance with various embodiments.
Figure 1B:
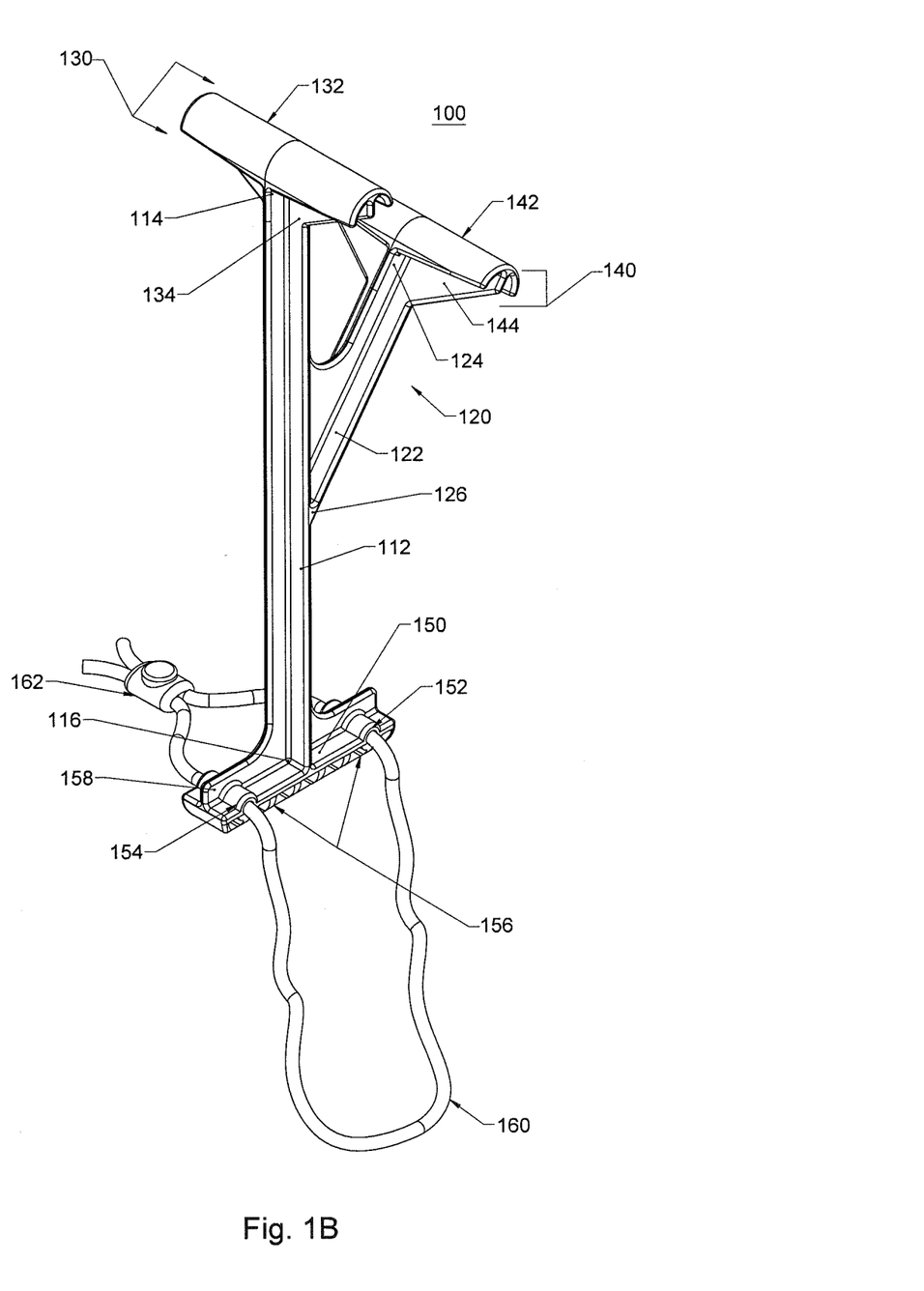
FIG. 1B illustrates a perspective side view of an optics support system, in accordance with various embodiments.

In various embodiments and with reference to FIGS. 1A and 1B, the optics support system 100 may be any suitable system or apparatus that is capable of supporting optics. Optics support system 100 may comprise a first member 110, a second member 120, a top rest 130 and a base 150. Optics support system 100 may also comprise a side rest 140 and a support strap 160.

In various embodiments, first member 110 may be configured to provide structural support for optics support system 100. First Member 110 may comprise a first end 116 and a second end 114. First member 110 may integrally and/or removably couple to base 150 at first end 116. First member 110 may integrally and/or removably couple to top rest 130 at second end 114.

In various embodiments, first member 110 may be any shape suitable for providing structure and support to optics support system 100. In this regard, first member 110 may have rectangular cross-sectional shaped. First member 110 may also be cylindrical shaped. First member 110 may comprise and/or couple to a reinforcement rib 112. First member 110 may be made of any suitable material. First member 110 may also have any suitable coating. For example, first member 110 may be made from a substantially rigid and durable plastic material. First member 110 may also be made from any suitably rigid and sufficiently durable material such as, for example, a metal, an alloy, a composite, a polymer, wood, and/or any other suitable material.

In various embodiments, top rest 130 may be configured to support an optical device. Top rest 130 may integrally and/or removably couple to second end 114 of first member 110. Top rest 130 may comprise any shape suitable for support of an optical device. Top rest 130 may comprise a substantially curved surface 132. Top rest 130 may also be cylindrically shaped. Top rest 130 may also comprise a substantially flat surface. Top rest 130 may comprise and/or couple to a reinforcement rib 134. Top rest 130 may be made of any suitable material. Top rest 130 may also have any suitable coating. Top rest 130 may be made from a substantially rigid and durable plastic material. In other embodiments, top rest 130 may be made from any suitably rigid and sufficiently durable material such as, for example, a metal, an alloy, a composite, a polymer, wood, and/or any other suitable material.

In various embodiments, base 150 may be configured to act as a pivot point for optics support system 100. Base 150 may integrally and/or removably couple to first end 116 of first member 110. Base 150 may comprise at least one aperture. Base 150 may also comprise a first aperture 152 and a second aperture 154. Base 150 may removably couple to support strap 160. In this regard, at least a portion of support strap 160 may pass through and be retained in first aperture 152 and/or second aperture 154. In various embodiments, base 150 may comprise one aperture, or a plurality of apertures.

In various embodiments, base 150 may comprise any suitable shape and/or size. Base 150 may be cylindrically shaped. Base 150 may also be rectangular shaped. Base 150 may comprise one or more cut-outs 156 to reduce the weight of base 150 and/or optics support system 100. Base 150 may comprise and/or couple to a reinforcement rib 158. Base 150 may be made of any suitable material. Base 150 may also have any suitable coating. For example, base 150 may be a substantially rigid and sufficiently durable plastic. Base 150 may be made from any suitably rigid and sufficiently durable material such as, for example, a metal, an alloy, a composite, a polymer, wood, and/or any other suitable material.

In various embodiments, support strap 160 may be configured to carry and deploy optics support system 100. Support strap 160 may removably couple to base 150. Portions of support strap 160 may removably couple to base 150. In this regard and as discussed herein, portions of support strap 160 may pass through and be retained in first aperture 152 and/or second aperture 154 of base 150. Support strap 160 may attach to base 150 in any suitable fashion such as, by tying support strap 160 in a knot around the intersection of base 150 and first member 110.

In various embodiments, support strap 160 may be made of any suitable material capable of carrying optics support system 100. Support strap 160 is made of material comprising cord-like, elastic properties. Support strap 160 may also be made of yarn, cord, string, rope, strap, and/or the like.

In various embodiments, support strap 160 may be configured to be adjustable in length. A frictional adjuster 162 may be attached towards one or more ends of support strap 160. In this regard, frictional adjuster 162 may allow a user to adjust the length of support strap 160 to any suitable length. In lieu of frictional adjuster 162, the length of support strap 160 may be adjusted in any suitable fashion. For example, support strap 160 may be tied at a desired length.

In various embodiments, second member 120 may be configured to support side rest 140. Second member 120 may be configured with a first end 126 and a second end 124. Second member 120 may integrally and/or removably couple to the middle of first member 110 at the first end 126. Second member 120 may integrally and/or removably couple to side rest 140 at the second end 124. Second member 120 may extend from first member 110 at an angle $\Theta$ relative to first member 110. In this regard, second member 120 may extend from first member 110 at an angle $\Theta$ between approximately 10° and approximately 90°. Second member 120 may extend from first member 110 at an angle $\Theta$ of approximately 45°.

In various embodiments, second member 120 may be any shape suitable for providing structure and support to side rest 140. Second member 120 may have a substantially rectangular cross-sectional shape. Second member 120 may also be substantially cylindrically shaped. Second member 120 may comprise and/or couple to a reinforcement rib 122. Second member 120 may be made of any suitable material. Second member 120 may also have any suitable coating. Second member 120 may be made from a substantially rigid and suitably durable plastic material. Second member 120 may also be made from any suitably rigid and sufficiently durable material such as, for example, a metal, an alloy, a composite, a polymer, wood, and/or any other suitable material.

In various embodiments, side rest 140 may be configured to support a user's hand while operating optics support system 100. Side rest 140 may integrally and/or removably couple to the second end 124 of second member 120. Side rest 140 may comprise any shape and size suitable to support a user's hand while operating optic support system 100. For example, side rest 140 may have a substantially curved surface 142. Side rest 140 may also be cylindrically shape. Side rest 140 may comprise and/or couple to a reinforcement rib 144. Side rest 140 may be made of any suitable material. Side rest 140 may also have any suitable coating. Side rest 140 may be made using any suitably rigid and substantially durable plastic material. Side rest 140 may also be made from any suitably rigid and sufficiently durable material such as, for example, a metal, an alloy, a composite, a polymer, wood, and/or any other suitable material.

Figure 2:
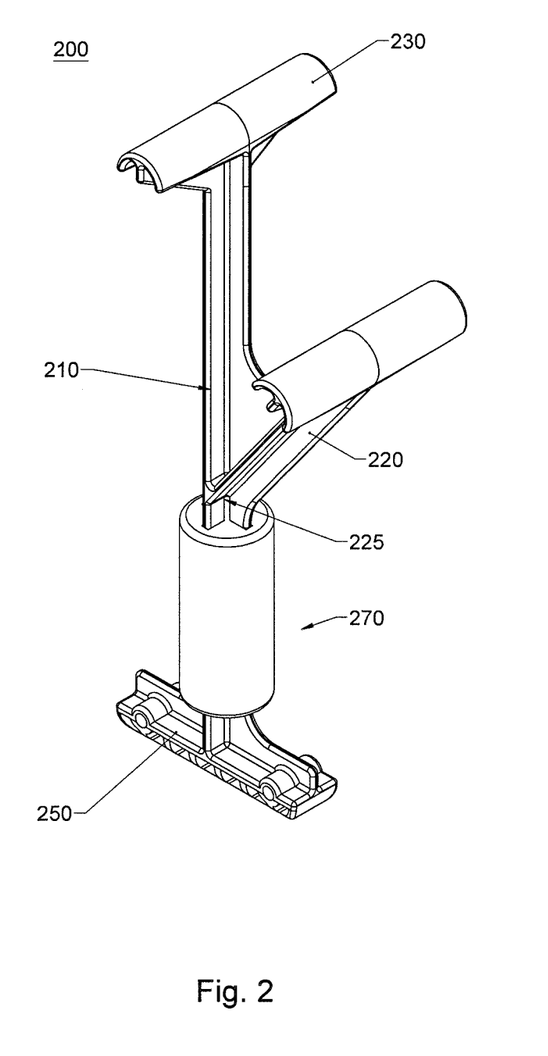
FIG. 2 illustrates a perspective side view of an optics support system, displaying a handle, in accordance with various embodiments.

In various embodiments and with specific reference to FIG. 2, first member 210 of optics support system 200 may comprise and/or removably couple to a handle 270. Handle 270 may be configured in any suitable fashion to function as a grip or holding place for optics support system 200. Handle 270 may be located between base 250 and the intersection 225 of first member 210 and second member 220. Handle 270 may also be located between top rest 230 and the intersection 225 of first member 210 and second member 220. Handle 270 may removably couple to first member 210 using any suitable attachment mechanism. For example, handle 270 may be a two-piece assembly or a clam shell assembly. Handle 270 may removably couple to first member 210 using any suitable fastener including a mechanical fastener (e.g., screw, nail, pin, and/or the like), a chemical fastener (e.g., an adhesive, tape, a plastic weld, and/or the like), and/or any other suitable fastener.

Handle 270 may comprise any shape and length suitable to function as a grip or holding place for optics support system 200. Handle 270 may be shaped with grooves to better fit a user's hand. Handle 270 may also comprise a curved surface area. Handle 270 may be made of any suitable material and/or may have any suitable coating. For example, handle 270 may be made out of a soft material such as foam or a pad. Handle 270 may also be made out of a hard, plastic material.

Figure 3:
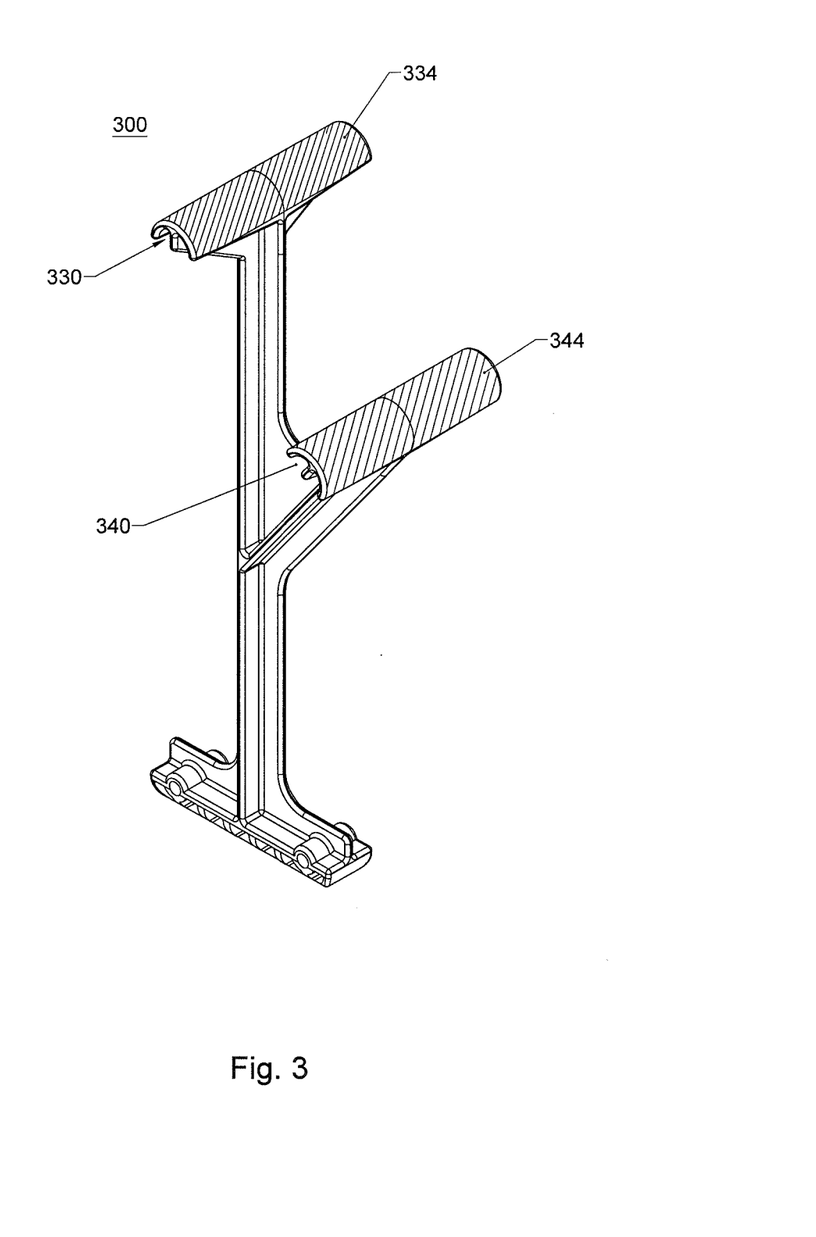
FIG. 3 illustrates a perspective side view of an optics support system, displaying a pad on a side rest and a rubberized coating on a top rest, in accordance with various embodiments.

In various embodiments and with reference to FIG. 3, side rest 340 of optics support system 300 may comprise and/or removably couple to a pad 344. Pad 344 may be configured in any suitable fashion to function as a resting place for a user's hand. Pad 344 may removably couple to side rest 340 using a mechanical arrangement such as, for example, a tongue and groove arrangement. Pad 344 may also removably couple to side rest 340 using any suitable fastener including a mechanical fastener (e.g., screw, nail, pin, and/or the like), a chemical fastener (e.g., an adhesive, tape, a plastic weld, and/or the like), and/or any other suitable fastener.

In various embodiments, pad 344 may be made out of any suitable material and may have any suitable coating. For example, pad 344 may be made of any soft material allowing a comfortable resting place. Pad 344 may also be made of foam, plastic, gel, or a rubber composite. Pad 344 may comprise any shape and size suitable to function as a rest for the user's hand. In this regard, pad 344 may be substantially the same size and shape of side rest 340. Pad 344 may also be smaller in size than side rest 340.

In various embodiments, top rest 330 of optics support system 300 may comprise and/or removably couple to a rubberized surface 334. Rubberized surface 334 may be configured in any suitable fashion to function as a resting place for an optic device. Rubberized surface 334 may be used to ensure that an optic device does not move around while optics support system 300 is in use. Rubberized surface 334 may be made of any suitable material and/or have any suitable coating. Rubberized surface 334 may comprise any shape and size suitable for its function. In this regard, rubberized surface 334 may be substantially the same size and shape as top rest 330. Rubberized surface 334 may also be smaller in shape and size than top rest 330.

Figure 4:
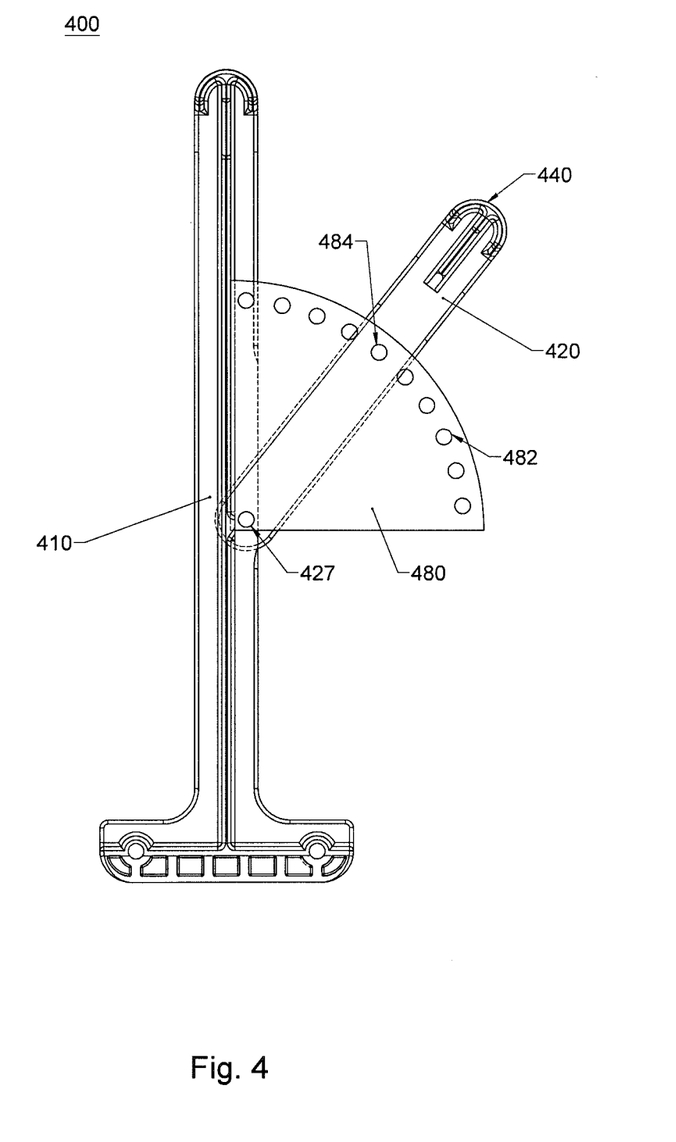
FIG. 4 illustrates a side view of an optics support system, displaying a first adjustment mechanism, in accordance with various embodiments.

In various embodiments and with reference to FIG. 4, optics support system 400 may comprise second member 420 that is configured to be adjustable relative to first member 410. Second member 420 may be rotatable about an axis 427 located where second member 420 attaches to first member 410. Second member 420 may be adjustable relative to first member 410 by using a first adjustment mechanism 480.

In various embodiments, first adjustment mechanism 480 may integrally or removably couple to the side of first member 410. In this regard, first adjustment mechanism 480 may be in substantially the same physical plane as second member 420. First adjustment mechanism 480 may be any suitable size, shape, and length to allow the second member 420 to adjust properly. First adjustment mechanism 480 may be made of any suitable material and/or have any suitable coating. For example, first adjustment mechanism 480 may be made from the same material as second member 420. First adjustment mechanism 480 may comprise a plurality of holes 482 along the outer edge. The plurality of holes 482 may be located at any suitable position on first adjustment mechanism 480. For example, first adjustment mechanism 480 may be configured to allow second member 420 to be adjusted to an angle Θ relative to first member 410. In this regard, second member 420 may extend from first member 410 at an angle Θ between approximately 10° and approximately 90°. In this regard, second member 420 may be adjustable with respect to first member 410 at a plurality of positions and/or angles Θ at defined angles corresponding to the locations of each of the plurality of holes 482.

In various embodiments, second member 420 may be configured with a pin 484 located below side rest 440. Pin 484 may integrally or removably couple to second member 420. The angle Θ between first member 410 and second member 420 may be changed by moving second member 420 at axis 427 and inserting pin 484 into a corresponding hole 482 of first adjustment mechanism 480. The angle Θ between first member 410 and second member 420 can then be adjusted by removing pin 484 from hole 482, repositioning the second member 420 at a different angle Θ, and reinserting pin 484 into a new corresponding hole 482 of first adjustment mechanism 480.

Figure 5A:
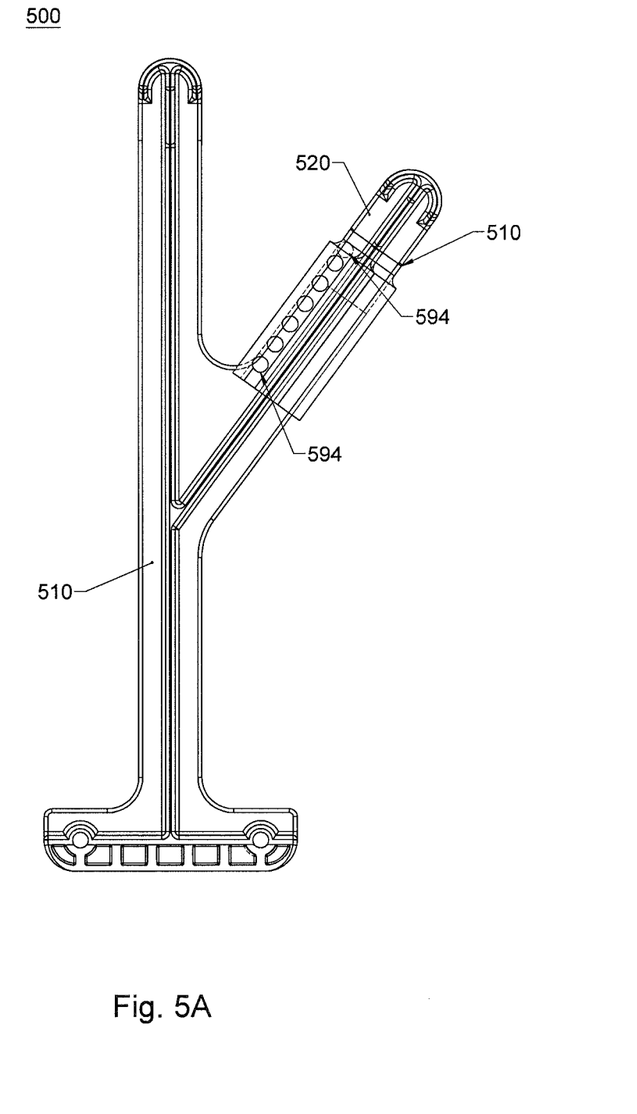
FIG. 5A illustrates a side view of an optics support system, displaying a second adjustment mechanism, in accordance with various embodiments.
Figure 5B:
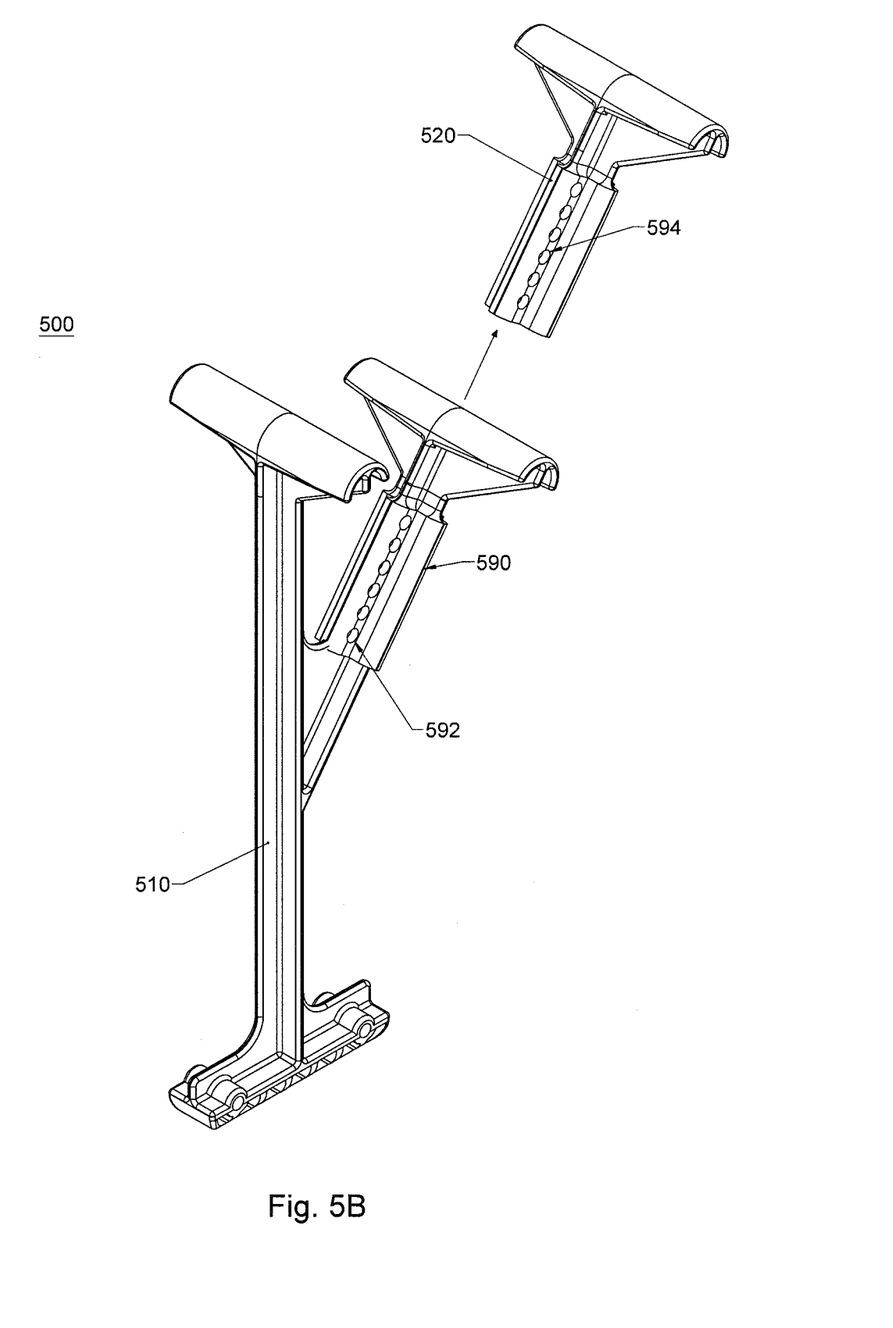
FIG. 5B illustrates a perspective side view of an optics support system, displaying a second adjustment mechanism, in accordance with various embodiments.

In various embodiments and with reference to FIGS. 5A and 5B, optics support system 500 may comprise second member 520 configured to be adjustable in length. Second member 520 may be adjustable in length by using a second adjustment mechanism 590. Second adjustment mechanism 590 may integrally or removably couple to first member 510, in a location and position substantially similar to that of second member 520. Second adjustment mechanism 590 may be configured to have a radius larger than second member 520. In this regard, second member 520 may removably fit within a volume and/or cavity defined by second adjustment mechanism 590. Second adjustment mechanism 590 may be any suitable size and length to accomplish this configuration.

In various embodiments, second adjustment mechanism 590 may be made of any suitable material and/or have any suitable coating. For example, second adjustment mechanism 590 may be made from the same material as second member 520. Second adjustment mechanism 590 may comprise a plurality of holes 592. The plurality of holes 592 may be located at any suitable position on the second adjustment mechanism 590.

In various embodiments, second member 520 may be configured to extend out of second adjustment mechanism 590 in a direction away from first member 510, or retract into second adjustment mechanism 590 in a direction towards first member 510. Second member 520 may be configured with a pin 594. Pin 594 may integrally or removably couple to second member 520. Pin 594 may be configured to removably insert into one of the holes 592 of second adjustment mechanism 590. By extending second member 520 away from first member 510, and inserting pin 594 into one of the holes 592 of second adjustment mechanism 590, the second member 520 may be adjusted and set to a first length. The first length can be adjusted by removing pin 594 from the current hole 592, repositioning second member 520 at a second length, and then reinserting pin 594 into the new corresponding hole 592 of second adjustment mechanism 590.

Figure 6A:
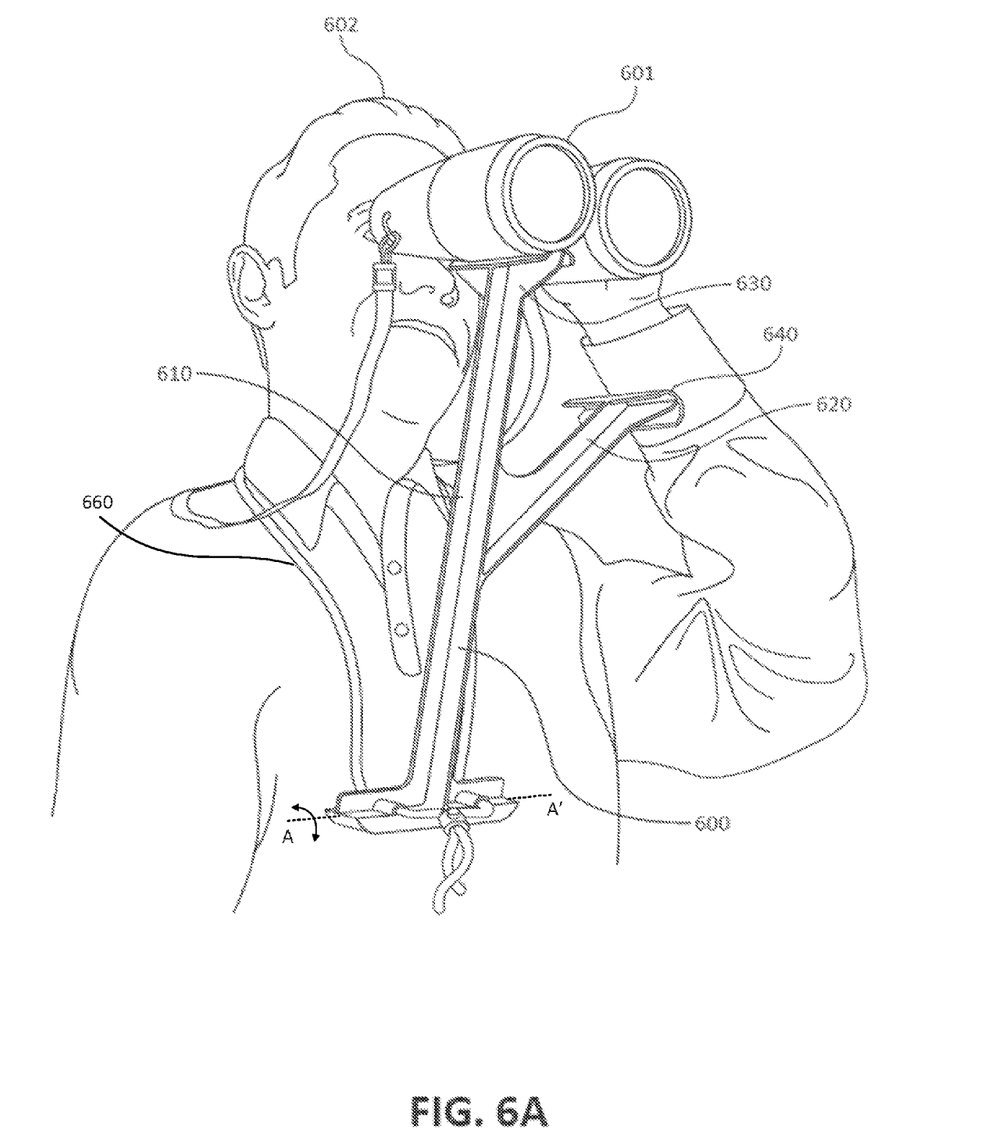
FIG. 6A illustrates a first perspective view of an optics support system being used by an operator, in accordance with various embodiments.
Figure 6B:
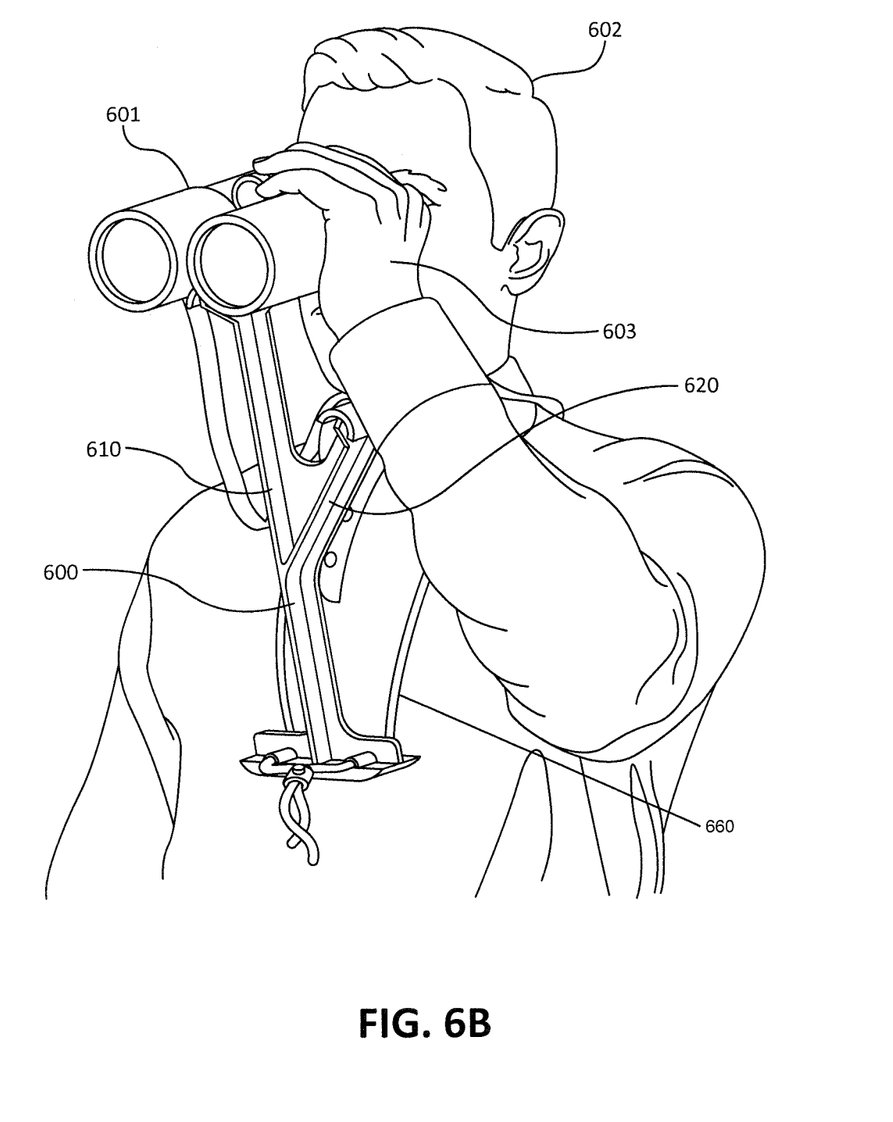
FIG. 6B illustrates a second perspective view of an optics support system being used by an operator, in accordance with various embodiments.

In various embodiments and with reference FIGS. 6A and 6B, optics support system 600 may be any wearable optics support system. Moreover, optics support system 600 may be configured to transfer the most of and/or substantially the entire load of an optic 601 (e.g., binoculars) to the shoulders, neck, and/or torso of a user 602. The load may be transferred along first member 610 to any suitable support including, for example, a strap 660, a harness, and/or the like. Optic 601 may be positioned on top rest 630 of first member 610. A hand 603 of user 602 may rest on and/or be supported by second member 620 via side rest 640. Hand 603 of user 602 may help to stabilize and/or balance optic 601 on top rest 630. Moreover, hands 603 of user 602 may be substantially unloaded when optic 601 is supported by optics support system 600.

In various embodiments and during operation, optics support system 600 may be configured to pivot against the body of user 602, such as by pivoting about axis A-A' of the base of optics support system 600, with rotation of the system in a plane depicted by the curved arrow (FIG. 6A). The ability of optics support system 600 to pivot may allow a user to quickly move between observing an area using optic 601 to observing an area with the user's eyes. Moreover, the wearability and portability of optics support system 600 may allow user 602 to have increased mobility while using optic 601 supported by optics support system 600.

In various embodiments, the interface between optics support system 600 and user 602 may be adjustable. This adjustability may allow the user to position optic 601 on optics support system 600 at a suitable height for comfortable viewing of an area through optic 601. The adjustability may come from adjusting the length of strap 660. For example and as discussed herein, the length of strap 660 may be tied to a particular length and/or adjusted with any suitable mechanism such as a friction adjuster 162, as shown in FIG. 1B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." The terms "comprise", "comprises", "comprising", "having", "including", "includes", or any variations of such terms are intended to reference a non-exclusive inclusion, such that a process, method, article, composition, or apparatus that comprises a list of elements does not include only those elements recited, but may also include other elements not expressly listed or inherent to such process, method, article, composition, or apparatus.

What is claimed is:

1. An apparatus for the support of optics, comprising:
   a first member having a first end and a second end, wherein the first end is opposite the second end;
   a second member having a first end and a second end, wherein the first end is opposite the second end, the first end is coupled to a middle of the first member, and the second end extends at an angle relative to the first member;
   a top rest coupled substantially perpendicularly to the second end of the first member, the first member and the top rest defining a first plane;
   a side rest coupled substantially perpendicularly to the second end of the second member;
   an elongate base coupled to the first end of the first member, an axis of the base oriented substantially perpendicularly to the first plane, wherein the base has an at least one aperture, and wherein the base is configured to serve as a pivot point for rotation of the apparatus about the axis in substantially the first plane; and a support strap configured to secure the apparatus to a user, wherein the support strap is removably coupled to the base by extending a portion of the support strap through the at least one aperture of the base, and wherein an adjustment of a length of the support strap produces an adjustment of a top rest height relative to the user;

wherein at least one of the first member, the second member, the top rest, and the base comprises a reinforcement rib.

2. The apparatus of claim 1, wherein the side rest comprises a curved surface.

3. The apparatus of claim 1, wherein the top rest comprises a curved surface.

4. The apparatus of claim 1, further comprising a frictional adjuster attached to the support strap and configured to provide for the adjustment of the length of the support strap.

5. The apparatus of claim 1, wherein the angle is an acute angle.

6. A system for the support of optics, comprising:
  a first member having a first end and a second end, wherein the first end is opposite of the second end;
  a second member having a first end and a second end, wherein the first end is opposite the second end, the first end is integrally formed to a midsection of the first member, and the second end extends at an angle relative to the first member;
  a top rest integrally formed to the second end of the first member, wherein the top rest comprises a curved surface;
  a side rest integrally formed to the second end of the second member, wherein the side rest comprises a curved surface;
  a base integrally formed to the first end of the first member, wherein the base comprises a plurality of cut-outs; and
  a support strap attached to the base;
  wherein the first member, the second member, the top rest, and the base are integrally formed from a plastic material, and wherein at least one of the first member, the second member, the top rest, and the base comprises a reinforcement rib.

7. The system of claim 6, wherein the side rest is configured to provide support for a user's hand.

8. The system of claim 6, wherein the base has an at least one aperture.

9. The system of claim 8, wherein the support strap is attached to the base by extending a portion of the support strap through the at least one aperture of the base.

10. The system of claim 6, further comprising a frictional adjuster attached to the support strap.

11. An apparatus for the support of optics, comprising:
  a first member having a first end, a second end, and a side, wherein the first end is opposite the second end;
  a second member having a first end and a second end, wherein the second member extends from and is integrally formed to the side of the first member, the first member and the second member define a first plane, and the second member extends at an angle relative to the first member;
  a top rest extending substantially perpendicularly from the second end of the first member;
  a side rest extending substantially perpendicularly from the second end of the second member; and
  a base extending substantially perpendicularly from the first end of the first member, wherein an axis of the base is in the first plane;
  wherein at least one of the first member, the second member, the top rest, and the base comprises a reinforcement rib.

12. The apparatus of claim 11, wherein the base contains an at least one aperture.

13. The apparatus of claim 12, further comprising a support strap removably attached to the base by extending a portion of the support strap through the at least one aperture of the base.

14. The apparatus of claim 13, further comprising a frictional adjuster attached to the support strap.

* * * * *